(12) United States Patent
Shibata et al.

(10) Patent No.: US 8,001,728 B2
(45) Date of Patent: Aug. 23, 2011

(54) GLASS RUN AND ITS ATTACHING STRUCTURE

(75) Inventors: Taizo Shibata, Aichi-ken (JP); Hideaki Minoura, Aichi-ken (JP); Kazuyuki Hayashi, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 770 days.

(21) Appl. No.: 12/003,508

(22) Filed: Dec. 26, 2007

(65) Prior Publication Data

US 2008/0172948 A1    Jul. 24, 2008

(30) Foreign Application Priority Data

Dec. 27, 2006 (JP) ................................ 2006-351322
Aug. 30, 2007 (JP) ................................ 2007-223585

(51) Int. Cl.
*E06B 7/16* (2006.01)
(52) U.S. Cl. .......... 49/489.1; 49/490.1; 49/440; 49/441; 49/479.1; 296/146.2
(58) Field of Classification Search .............. 49/441, 49/440, 489.1, 490.1, 495.1, 479.1, 475.1, 49/428; 296/146.2
See application file for complete search history.

(56) References Cited

U.S. PATENT DOCUMENTS

| | | | | |
|---|---|---|---|---|
| 1,582,506 A | * | 4/1926 | Bridgwood | 49/211 |
| 1,978,325 A | * | 10/1934 | Reid | 49/441 |
| 2,232,810 A | * | 2/1941 | Simpson et al. | 49/440 |
| 3,328,918 A | * | 7/1967 | Brissette et al. | 49/415 |
| 3,656,259 A | * | 4/1972 | Stark | 49/440 |
| 4,663,888 A | * | 5/1987 | Okamoto | 49/441 |
| 4,908,989 A | * | 3/1990 | Omura et al. | 49/441 |
| 5,219,382 A | * | 6/1993 | Backes | 49/440 |

(Continued)

FOREIGN PATENT DOCUMENTS

CN    1764557 A    4/2006

(Continued)

OTHER PUBLICATIONS

English-language translation of a Chinese Office Action dated Nov. 6, 2009.

*Primary Examiner* — David Dunn
*Assistant Examiner* — David E Allred
(74) *Attorney, Agent, or Firm* — McGinn IP Law Group, PLLC

(57) ABSTRACT

A glass run includes a main body portion including a base bottom portion, a vehicle exterior side wall portion and a vehicle interior side wall portion attached along an inner periphery of a door frame and seal lips extended to an inner side of the main body portion and an entire region in a longitudinal direction thereof is formed by extrusion. The base bottom portion and the vehicle exterior side wall portion and the base bottom portion and the vehicle interior side wall portion are respectively connected by deformed connecting portions. The deformed connecting portion is thin-walled more than the base bottom portion and the two side wall portions and constitutes substantially a J-like shape in a section thereof to provide a predetermined length in a width direction. At two corner portions of the glass run, the deformed connecting portions are deformed by being folded to bend at fold points, the base bottom portion is smoothly disposed on an inner peripheral side, and is continuously bent without providing a slit or a notch.

7 Claims, 11 Drawing Sheets

U.S. PATENT DOCUMENTS

| | | | | |
|---|---|---|---|---|
| 5,524,388 A | * | 6/1996 | Chowdhury et al. | 49/374 |
| 5,548,929 A | * | 8/1996 | Larsen et al. | 49/441 |
| 5,743,047 A | * | 4/1998 | Bonne et al. | 49/490.1 |
| 6,185,869 B1 | * | 2/2001 | Kawai | 49/441 |
| 6,205,712 B1 | * | 3/2001 | Ellis | 49/441 |
| 6,357,182 B1 | * | 3/2002 | Nozaki | 49/498.1 |
| 6,412,226 B1 | * | 7/2002 | Nozaki et al. | 49/441 |
| 6,499,256 B1 | * | 12/2002 | Aritake et al. | 49/441 |
| 6,996,936 B1 | * | 2/2006 | Maass | 49/479.1 |
| 7,294,386 B2 | * | 11/2007 | Murase et al. | 428/99 |
| 7,350,849 B2 | * | 4/2008 | Roush et al. | 296/146.9 |
| 7,356,967 B2 | * | 4/2008 | Zwolinski et al. | 49/440 |
| 2001/0015035 A1 | * | 8/2001 | Nozaki | 49/440 |
| 2004/0221512 A1 | * | 11/2004 | Hoffman et al. | 49/440 |
| 2005/0120633 A1 | * | 6/2005 | Takase et al. | 49/441 |
| 2006/0026903 A1 | * | 2/2006 | Nozaki et al. | 49/441 |
| 2006/0107601 A1 | * | 5/2006 | Inagaki et al. | 49/441 |
| 2007/0089371 A1 | | 4/2007 | Krause | |
| 2007/0251152 A1 | * | 11/2007 | Takase et al. | 49/441 |
| 2007/0271853 A1 | * | 11/2007 | Yatsuda et al. | 49/489.1 |
| 2009/0241431 A1 | * | 10/2009 | Shibata et al. | 49/490.1 |
| 2010/0199568 A1 | * | 8/2010 | Kondo et al. | 49/441 |
| 2011/0023371 A1 | * | 2/2011 | Lethers et al. | 49/478.1 |

FOREIGN PATENT DOCUMENTS

| | | | |
|---|---|---|---|
| EP | 403854 A1 | * | 12/1990 |
| JP | 63078812 A | * | 4/1988 |
| JP | 03224846 A | * | 10/1991 |
| JP | 05038944 A | * | 2/1993 |
| JP | 06-219160 | | 8/1994 |
| JP | 11342751 | * | 12/1999 |
| JP | 2002-274187 | | 9/2002 |
| JP | 2005088328 | * | 4/2005 |
| JP | 2007196909 A | * | 8/2007 |
| JP | 2009227242 A | * | 10/2009 |
| JP | 2009255898 A | * | 11/2009 |
| JP | 2010052461 A | * | 3/2010 |

\* cited by examiner

GLASS RUN AND ITS ATTACHING STRUCTURE

BACKGROUND OF THE INVENTION

1. Field of the Invention

The present invention relates to a glass run and its attaching structure.

2. Related Art

Generally, a glass run is provided along an inner periphery of a door frame of an automobile. A glass run includes a main body portion having a section in a U-shape comprising a base bottom portion and a vehicle interior side wall portion and a vehicle exterior side wall portion extended from the base bottom portion and a vehicle interior side seal lip and a vehicle exterior side seal lip extended to an inner side of the main body portion in view from a sectional direction thereof. According to the above-described glass run, the main body portion is attached to an attaching portion (for example, channel portion) provided along the inner periphery of the door frame, and peripheral edge portions of inner and outer faces of the door glass are squeezed to be sealed by the two seal lips.

A glass run in recent years is constituted by an extruded portion molded substantially in a linear shape and a molded portion for connecting the extruded portions in a state of making a predetermined angle therebetween, and constituted by a front vertical side portion, an upper side portion and a rear vertical side portion along a shape of a door frame. That is, a molded portion is provided corresponding to a corner portion (refer to, for example, JP-A-6-219160).

Further, there is also a technology of mounting a glass run after partially notching a long member formed by extrusion-molding and constituting a corner shape by folding to bend the portion (refer to, for example, JP-A-2002-274187).

However, when the glass run is constituted by the extruded portion and the molded portion as in JP-A-6-219160 mentioned above, there is a concern that a connecting line of the extruded portion and the molded portion appears in an outlook thereof and owing thereto, a reduction in an outlook (i.e. appearance) quality is brought about. Further, there is also a case in which constituting materials of the extruded portion and the molded portion differ from each other, colors/lusters of surfaces thereof differ from each other significantly, and there is a concern of bringing about a reduction in an outlook quality also by the difference of the color/luster. Further, a stepped difference is liable to be formed at a boundary portion (connecting portion) of the extruded portion and the molded portion and there is a concern of bringing about a reduction in a seal performance. Further, the injection molding is needed other than the extrusion-molding, and therefore, an increase in a fabrication cost and a fabrication step number is brought about by that amount.

Further, even when the corner shape is formed by providing the notch (slit) partially as in JP-A-2002-274187 mentioned above, work is needed for forming the corner shape. Therefore, the increase in the fabrication cost and the fabrication step number is invariably brought about by that amount.

Meanwhile, there is a concern of shifting to move a glass run in a longitudinal direction in opening and closing (moving up and down) door glass by operating stresses of opening and closing the door glass on the glass run. In order to wipe out the concern, generally, in a glass run constituted by an extruded portion and a molded portion, there is partially provided a projected portion for preventing shift locked by a hole portion or a recess portion formed at an attaching portion for the molded portion.

However, when an entire region in a longitudinal direction of the glass run is constituted by an extruded portion member as in JP-A-2002-274187 mentioned above, the glass run is extruded to be molded by the same sectional shape, and therefore, the projected portion for preventing shift cannot partially be provided as described above simultaneously with molding. That is, when the projected portion for preventing shift is going to be provided partially, after extrusion-molding, a step of partially providing the projected portion is needed separately by injection molding after extrusion-molding. Therefore, a reduction in a fabrication efficiency is brought about and there is a concern of reducing the meaning of constituting an entire region in the longitudinal direction by the extruded portion member.

SUMMARY OF THE INVENTION

The invention has been carried out in view of the above-described situation and it is a first object thereof to provide a glass run capable of promoting an outlook quality and a seal performance and capable of achieving a remarkable reduction in a fabrication cost and a fabrication step number. Further, it is a second object thereof to provide a structure of attaching a glass run capable of preventing a shifting movement caused by stresses in opening and closing door glass while restraining a reduction in a fabrication efficiency.

An explanation will be given of respective means suitable for resolving the above-described object or the like item by item. Further, operation and effect or the like particular to the corresponding means will be added as necessary.

(1) A glass run comprising:

a main body portion attached to an attaching portion provided along an inner periphery of a door frame of a vehicle, including a base bottom portion, a vehicle interior side wall portion and a vehicle exterior side wall portion so as to constitute a U-shaped section, a vehicle interior side seal lip and a vehicle exterior side seal lip extended from substantially front ends of the vehicle interior side wall portion and the vehicle exterior side wall portion to an inner side of the main body portion;

wherein a region in a longitudinal direction of the glass run including an upper side portion corresponding to an upper edge portion of a door glass and a front vertical side portion and a rear vertical side portion corresponding to a front edge portion and a rear edge portion of the door glass is formed by extrusion and a corner portion thereof is formed continuously without providing a notch by being bent.

According to (1), the entire region in the longitudinal direction of the glass run comprising the upper side portion the front vertical side portion, the rear vertical side portion, and the two corner portions is formed by extrusion. Therefore, different from a case of constituting a glass run by connecting a plurality of molded members including an extruded portion member by injection molding, a situation that a connecting line appears in an outlook can be avoided. Further, a situation of partially bringing about a difference in color/luster in the longitudinal direction (peripheral direction) of the glass run can be avoided. As a result, an outlook quality is promoted. Further, a concern of forming a stepped difference by connection in the longitudinal direction of the glass run can be avoided, and a seal performance is promoted in the meaning. Further, a reduction in a fabrication cost and a fabrication step number can be achieved by an amount of displacing with injection molding.

Further, the corner portion is formed by being bent continuously without providing a slit or a notch, and therefore, a reduction in fabrication cost and fabrication step number can be achieved by an amount of dispensing with working for forming the corner portion of a notch or the like.

(2) A glass run comprising:

a main body portion attached to an attaching portion provided along an inner periphery of a door frame of a vehicle, including a base bottom portion a vehicle interior side wall portion and a vehicle exterior side wall portion so as to constitute a U-shaped section, and a vehicle interior side seal lip and a vehicle exterior side seal lip extended from substantially front ends of the vehicle interior side wall portion and the vehicle exterior side wall portion to an inner side of the main body portion, the glass run including:

an upper side portion corresponding to an upper edge portion of door glass, a front vertical side portion corresponding to a front edge portion of the door glass, a rear vertical side portion corresponding to a rear edge portion of the door glass, a corner portion of the upper side portion and the front vertical side portion and a corner portion of the upper side portion and the rear vertical side portion;

wherein at the corner portions, in comparison with other portion, the base bottom portion is disposed on an inner peripheral side and is continuously bent without providing a notch; and wherein the respective portions are formed as one piece of a continuous member by extrusion over an entire region in a longitudinal direction thereof.

According to (2), basically, operation and effect similar to those of (1) are achieved. Further, particularly, according to (2), at the two corner portions, in comparison with other portion, the corner portions are bent by making the base bottom portion disposed on the inner peripheral side. Thereby, reasonable smooth bending can be carried out without forming a slit or the like and a situation that the sectional shape at the corner portion becomes significantly irregular by a stress in accordance with the bending is avoided. As a result, the glass run can easily and stably be mounted and the function of the glass run can sufficiently be achieved.

(3) A glass run comprising:

a main body portion attached to an attaching portion provided along an inner periphery of a door frame of a vehicle, including a base bottom portion, a vehicle interior side wall portion and a vehicle exterior side wall portion so as to constitute a U-shaped section, and a vehicle interior side seal lip and a vehicle exterior side seal lip extended from substantially front ends of the vehicle interior side wall portion and the vehicle exterior side wall portion to an inner side of the main body portion, the glass run including:

an upper side portion corresponding to an upper edge portion of door glass, a front vertical side portion corresponding to a front edge portion of the door glass, a rear vertical side portion corresponding to a rear edge portion of the door glass, a corner portion of the upper side portion and the front vertical side portion, and a corner portion of the upper side portion and the rear vertical side portion, further including:

deformed connecting portions for respectively connecting the base bottom portion and the vehicle interior side wall portion and the base bottom portion of the vehicle exterior side wall portion, thin-walled more than the base bottom portion and the side wall portions and having predetermined lengths in a width direction;

wherein at the corner portions, in comparison with other portion, the base bottom portion is disposed on an inner peripheral side by deforming the deformed connecting portions and continuously bent without providing a notch; and wherein the respective portions are formed as one piece of a continuous member by extrusion over an entire region in a longitudinal direction.

According to (3), basically, operation and effect similar to those of (2) are achieved. Further, particularly, the glass run of (3) includes the deformed connecting portions respectively connecting the base bottom portion and the vehicle interior side wall portion and the base bottom portion and the vehicle exterior side wall portion, thin-walled more than the base bottom portion and the two side wall portions and having predetermined lengths in a width direction. Further, at the two corner portions, in comparison with other portion, the bottom portion is easily disposed smoothly on the inner peripheral side by deforming the deformed connecting portion. As a result, operation and effect of (2) mentioned above are further firmly be achieved.

(4) The glass run characterized in that the deformed connecting portions include fold portions constituting substantially in J-like shape in sections thereof at end portions of sides of the vehicle interior side wall portion and the vehicle exterior side wall portion or at vicinities thereof, and at the corner portions, the deformed connecting portions are deformed by being folded to bend at the fold portions.

According to (4), the pair of deformed connecting portions constituting sections substantially in the J-like shape include the fold portions (fold points in sectional view) at end portion on sides of the two side wall portions or vicinities thereof. Further, at the corner portion, the pair of deformed connecting portions are deformed by being folded to bend at the fold portions. Therefore, at the two corner portions, the base bottom portion is easily disposed further smoothly and the above-described operation and effect are further firmly be achieved.

(5) The glass run characterized in that the main body portion constitutes a symmetrical shape centering on a center in a width direction.

According to (5), the main body portion constitutes the symmetrical shape centering on the center in the width direction. Therefore, at the two corner portions, in making the base bottom portion disposed on the inner peripheral side, a situation of inclining the base bottom portion is difficult to be brought about, and the base bottom portion can be disposed on the inner peripheral side by maintaining an angular relationship of the base bottom portion relative to the two side wall portions. As a result, a situation of making the sectional shape irregular at the corner portion can further easily be avoided.

(6) The glass run characterized in that an inner peripheral face of the base bottom portion is provided with guide lips which are extended from the base bottom portion to the vehicle interior side wall portion and the vehicle exterior side wall portion and front ends of which are brought into contact or substantially brought into contact with the vehicle interior side wall portion and the vehicle exterior side wall portion.

According to (6), the guide lip is provided at the inner peripheral face of the base bottom portion. Therefore, at the two corner portions, in making the base bottom portion disposed on the inner peripheral side, the base bottom portion can smoothly be disposed on the inner peripheral side by guiding the two guide lips by the two side wall portions (occasionally, while sliding along wall faces of the two side wall portions). As a result, a situation of making the sectional shape irregular at the corner portion is further easily be avoided. Further, when the symmetrical shape is constituted as shown by (5), the above-described effect is further ensured.

(7) The glass run characterized in that an outer peripheral face of the base bottom portion is provided with a water invasion preventing lip capable of being brought into contact with a channel portion constituting the attaching portion.

According to (7), when the glass run is mounted, the water invasion preventing lip provided at the outer peripheral face of the base bottom portion can be brought into contact with the channel portion constituting the attaching portion. Thereby, a situation that water invades by way of the channel portion can be prevented.

(8) The glass run characterized in that the water invasion preventing lips constitute a pair, a front end of the water invasion preventing lip on a side of the vehicle exterior side wall portion is extended to a vehicle exterior side, and the water invasion preventing lip on a side of the vehicle interior side wall portion is extended to a vehicle interior side.

According to (8), the front end of the water invasion preventing lip on the side of the vehicle exterior side wall portion is extended to the vehicle exterior side, the front end of the water invasion preventing lip on the side of the vehicle interior side wall portion is extended to the vehicle interior side, and therefore, water can further firmly be prevented from invading. Further, when the symmetrical shape is constituted as shown by (5), a drawback by mistake of mounting is wiped out.

(9) An attaching structure of a glass run comprising:
a glass run comprising:
a main body portion attached to an attaching portion provided along an inner periphery of a door frame of a vehicle, including a base bottom portion and a vehicle interior side wall portion and a vehicle exterior side wall portion extended from the base bottom portion and constituting a section thereof by substantially a U-shape, and a vehicle interior side seal lip and a vehicle exterior side seal lip extended from substantially front ends of the vehicle interior side wall portion and the vehicle exterior side wall portion to an inner side of the main body portion;
wherein an entire region in a longitudinal direction comprising an upper side portion corresponding to an upper edge portion of door glass, and a front vertical side portion and a rear vertical side portion corresponding to a front edge portion and a rear edge portion of the door glass is constituted by an extruded portion member;
wherein at least one of the front vertical side portion and the rear vertical side portion is provided with an engaging portion formed by notching a portion thereof at a portion attached to a lower side of a belt line; and
wherein the attaching portion is provided with an engaged portion engaged with the engaging portion in a state of attaching the glass run.

According to (9), the entire region in the longitudinal direction of the glass run is constituted by the extruded portion member. Therefore, basically, operation and effect similar to (1) mentioned above are achieved.

Further, by engaging the engaging portion notched to be formed at the glass run and the engaged portion provided at the attaching portion, shift movement in the longitudinal direction of the glass run is restricted. Therefore, in opening and closing (moving up and down) or the like of the door glass, a situation that the glass run is shifted to move in the longitudinal direction can be prevented. Further, the engaging portion and the engaged portion are provided at a portion which is on a lower side of the belt line, that is, disposed at inside of the door panel and does not appear in the outlook. Therefore, a situation of bringing about a reduction in an outlook quality owing to that the engaging portion and the engaged portion are optically recognized can be avoided. In addition thereto, for example, it is not necessary to carry out a separate injection molding step or the like after extrusion as in a case of partially providing a projection locked by a hole portion or a recess portion formed at the attaching portion for preventing a shift, and therefore, a reduction in a fabrication efficiency can be restrain.

(10) The attaching structure of a glass run according to (9), characterized in that the glass run includes a vehicle interior side design lip extended from the substantially front end of the vehicle interior side wall portion to a vehicle interior side and a vehicle exterior side design lip extended from the substantially front end of the vehicle exterior side wall portion to a vehicle exterior side;
wherein the engaging portion is formed on at least one of the vehicle interior side design lip and the vehicle exterior side design lip.

According to (10), the engaging portion is notched to be formed on the design lip. Therefore, a situation of bringing about a reduction in a function of the glass run (reduction in seal performance or the like) owing to forming the engaging portion at, for example, the main body portion or the seal lip can be prevented. Further, notch operation can comparatively be simply be carried out. Further, a projected streak portion projected from the main body portion to outer side may be formed in extrusion and the engaging portion may be formed by notching a portion of the projected streak portion after extrusion. Also in this case, the engaging portion can be formed without deteriorating the function of the main body portion and the seal lip.

(11) The attaching structure of a glass run according to (10), characterized in that a channel member having a section substantially in a U-shape for fitting the main body portion to an inner side thereof and a connecting portion for connecting the channel member and a door main body are provided at a portion of the attaching portion downward from the belt line;
wherein the engaged portion engaged with the engaging portion formed on at lest one of the vehicle interior side design lip and the vehicle exterior side design lip brought into press contact with an outer side face of the channel member is formed by extending to form a glass opening portion opened and closed by the door glass to an inner peripheral side along an outer side face of the channel member.

According to (11), by partially changing the shape of the connecting portion for fixing the channel member to the door main body, the engaged portion can corporately easily be formed. Therefore, a situation of bringing about a reduction in a fabrication efficiency owing to forming the engaged portion can be restrained.

Further, a portion of the attaching portion upward from the belt line is constituted by a channel-less structure in which a channel member having a section substantially in a U-shape is not attached to between an inner panel and an outer panel constituting the door frame, and the glass run may be fitted to between front end portions of the inner panel and the outer panel. In this case, a reduction in cost can be achieved by an amount of displacing with the channel member at the portion upward from the belt line.

(12) The attaching structure of a glass run according to (10), characterized in that a channel member having a section substantially in a U-shape for fitting the main body portion to an inner side and a connecting portion for connecting the channel member and a door main body is provided at a portion of the attaching portion downward from the belt line;
wherein the engaged portion engaged with the engaging portion formed on at least one of the vehicle interior side design lip and the vehicle exterior side design lip brought into press contact with an outer side face of the channel member is formed by folding to bend a portion of the channel member.

According to (12), by partially changing the shape of the channel member, the engaging portion can comparatively be easily be formed. Therefore, a situation of bringing about a reduction in a fabrication efficiency owing to forming the engaged portion can be restrained.

(13). The attaching structure of a glass run according to (9), characterized in that a boundary portion of the base bottom portion and the vehicle interior side wall portion and a boundary portion of the base bottom portion and the vehicle exterior side wall portion are provided with deformed connecting portions thin-walled more than other portion of the main body portion;

wherein by attaching the glass run to the corner portion of the attacking portion, the deformed connecting portion of the glass run corresponding to the corner portion is inclined to be deformed to an inner peripheral side of the glass opening portion and the base bottom portion is displaced to the inner peripheral side of the glass opening portion.

According to (13), in attaching the glass run to the attaching portion, at the corner portion, in comparison with other portion (linear portion), the base bottom portion is displaced to the inner peripheral side of the glass opening portion. Thereby, reasonable smooth bending can be carried out without forming a slit or the like at a portion corresponding to the corner portion of the glass run. Therefore, a situation of making the sectional shape of the corner portion significantly irregular by a stress in accordance with the bending is avoided. As a result, the glass run can easily and stably be mounted and the function of the glass run can sufficiently be achieved. Further, for example, in order to smoothly bend the glass run, at the portion of the glass run corresponding to the corner portion, it is not necessary to form a slit, a notch or the like to the main body portion or the seal lip, and therefore, a reduction the seal performance and a reduction in the outlook quality can be prevented.

DETAILED DESCRIPTION OF THE PREFERRED EMBODIMENT

First Embodiment

Figure 1:
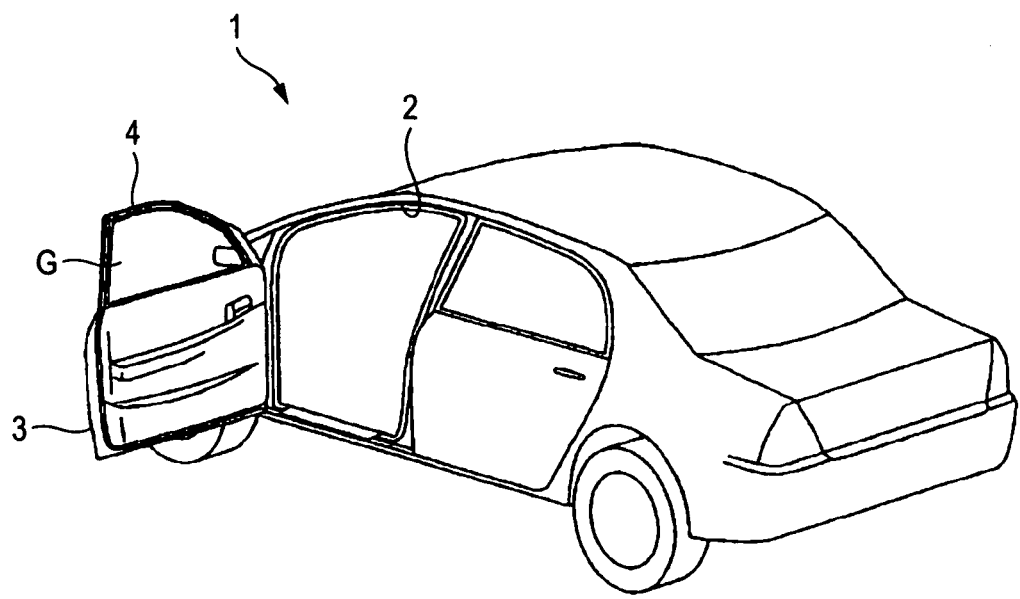
FIG. 1 is a perspective view showing an outline constitution of an automobile constituted by being mounted with a glass run according to a first embodiment.

A first embodiment will be explained in reference to the drawings as follows. As shown by FIG. 1, a door opening portion 2 of an automobile 1 as a vehicle is provided with a front door 3 (hereinafter, simply referred to as door) openably/closably. The door 3 includes door glass G capable of being moved up and down and a glass run 4 corresponding to an outer peripheral shape of the door glass G.

Figure 2:
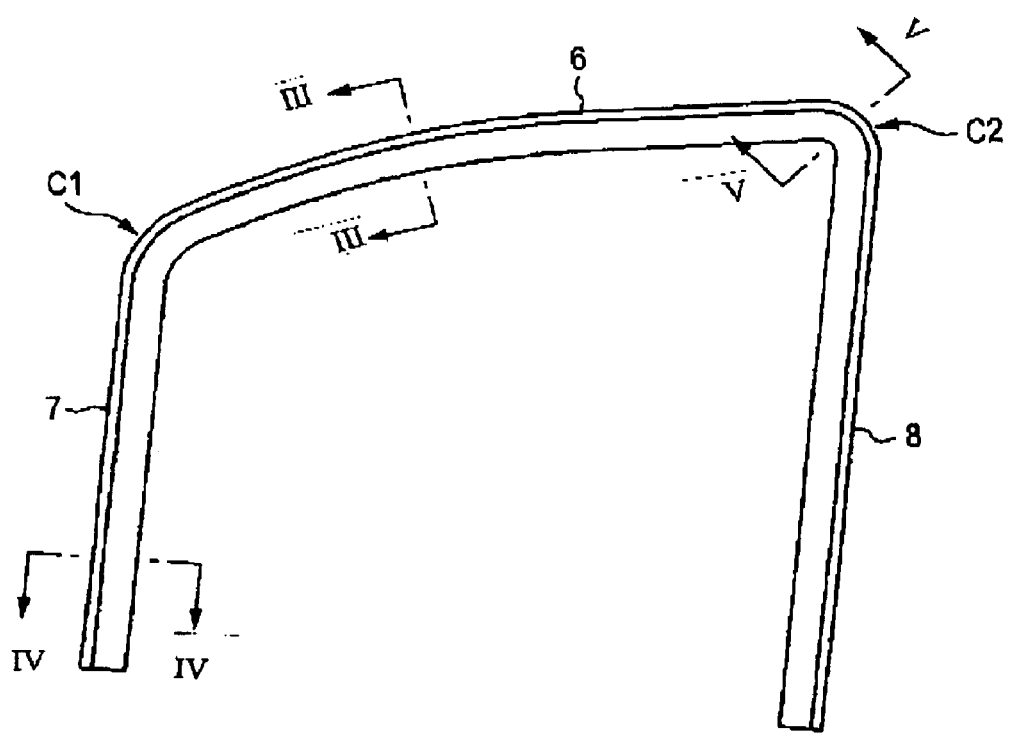
FIG. 2 is a front schematic view showing an outline constitution of the glass run according to the first embodiment.

As shown by FIG. 2, the glass run 4 includes an upper side portion 6 constituting a portion corresponding to an upper edge portion of the door glass G, a front vertical side portion 7 constituting a portion extended downward from an upper end portion of the upper side portion 6 corresponding to a front edge portion of the door glass G, and a rear vertical side portion 8 constituting a portion extended downward from a rear end portion of the upper side portion 6 corresponding to a rear edge portion of the door glass G. The glass run 4 of the embodiment comprises EPDM (ethylene-propylene-diene copolymer) rubber, an entire region in a longitudinal direction comprising the front vertical side portion 7, the upper side portion 6 and the rear vertical side portion 8 is formed by extrusion, and corner portions C1 and C2 are formed by continuously bending the glass run 4 respectively at two portions without providing a slit or a notch (the point will be descried later in details).

Figure 3:
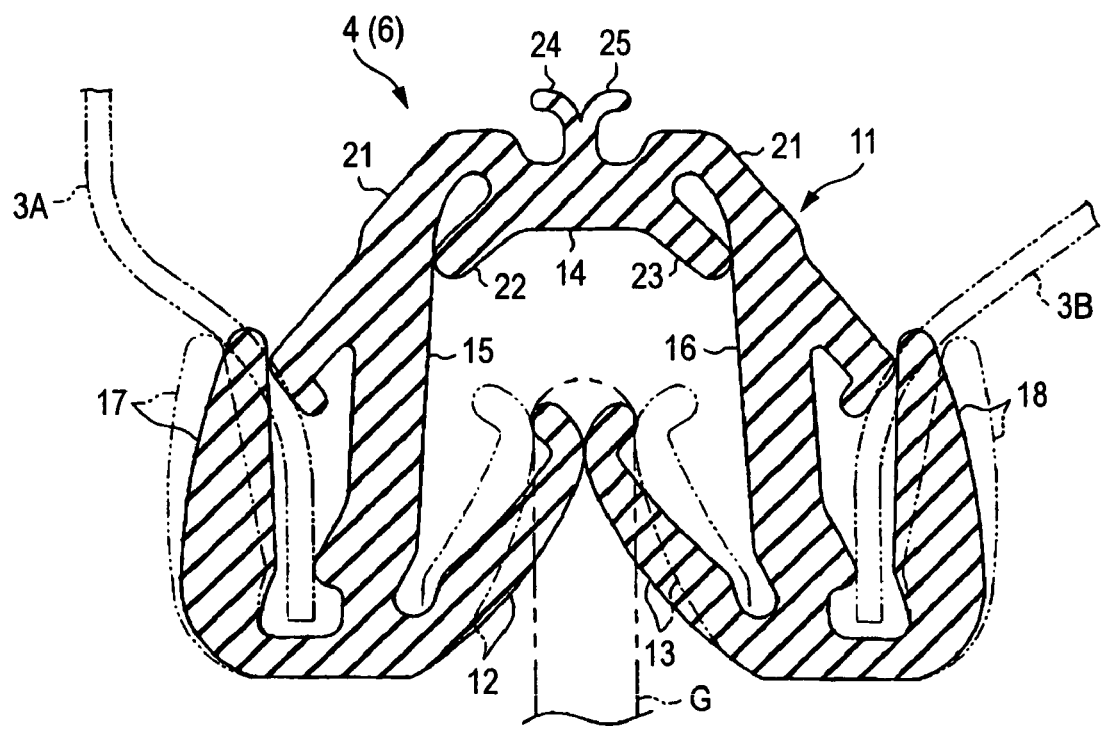
FIG. 3 is a sectional view taken along a line III-III of FIG. 2.
Figure 4:
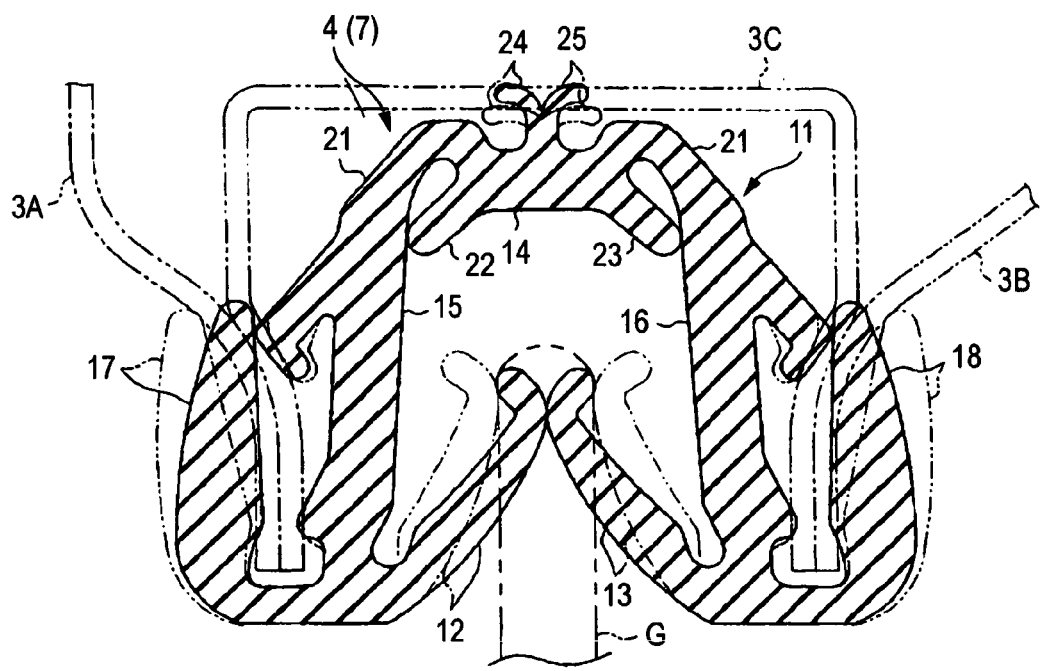
FIG. 4 is a sectional view taken along a line IV-IV of FIG. 2.

As shown by FIGS. 3 and 4, the glass run 4 includes a main body portion 11 and a vehicle exterior side seal lip 12 and a vehicle interior side seal lip 13. The main body portion 11 includes a base bottom portion 14 fitted to an attaching portion constituted by an outer panel 3A and an inner panel 3B of the door 3, and a vehicle exterior side wall portion 15 and a vehicle interior side wall portion 16 extended in a direction substantially orthogonal to the base bottom portion 14 and a section thereof is constituted substantially by a U-shape as a whole. The vehicle exterior side seal lip 12 is extended from substantially a front end of the vehicle exterior side wall portion 15 to an inner peripheral side of the main body portion 11 and the vehicle interior side lip 12 is extended from substantially a front end of the vehicle interior side wall portion 16 to the inner side of the main body portion 11. Further, in a state of closing the door glass G, the vehicle exterior side seal lip 12 is brought into press contact with an outer side face of the door glass G and the vehicle interior side seal lip 13 is brought into press contact with an inner side face of the door glass G. Thereby, a vehicle exterior side and a vehicle interior side of the door glass G are respectively sealed. Further, there are provided a vehicle exterior side design lip 17 extended from the vehicle exterior side wall portion 15 to a vehicle exterior side, and a vehicle interior side design lip 18 extended from the vehicle interior side wall portion 16 to a vehicle interior side.

Further, according to the embodiment, the entire region in the longitudinal direction of the glass run 4 is formed as one piece of a contiguous member only by extrusion, and therefore, with regard to any of the upper side portion 6, the front vertical side portion 7 and the rear vertical side portion 8, the main body portion 11 and the pair of seal lips 12 and 13 and the like are provided, and the same sectional shape is constituted. However, with regard to lower portions of the front vertical side portion 7 and the rear vertical side portion 8, channel portions 3C are provided between the outer panel 3A and the inner panel 3B, and the glass run 4 is attached to inside of the channel portion 3C. Further, although not illustrated, a support portion (stopper) made of a metal is provided corresponding to an upper portion of the upper side portion 6, and the base bottom portion 14 of the upper side portion 6 is made to be able to be brought into contact with the support portion. Thereby, a stress in moving up the door glass G can be received.

Next, a characteristic constitution of the embodiment will be explained.

Figure 5:
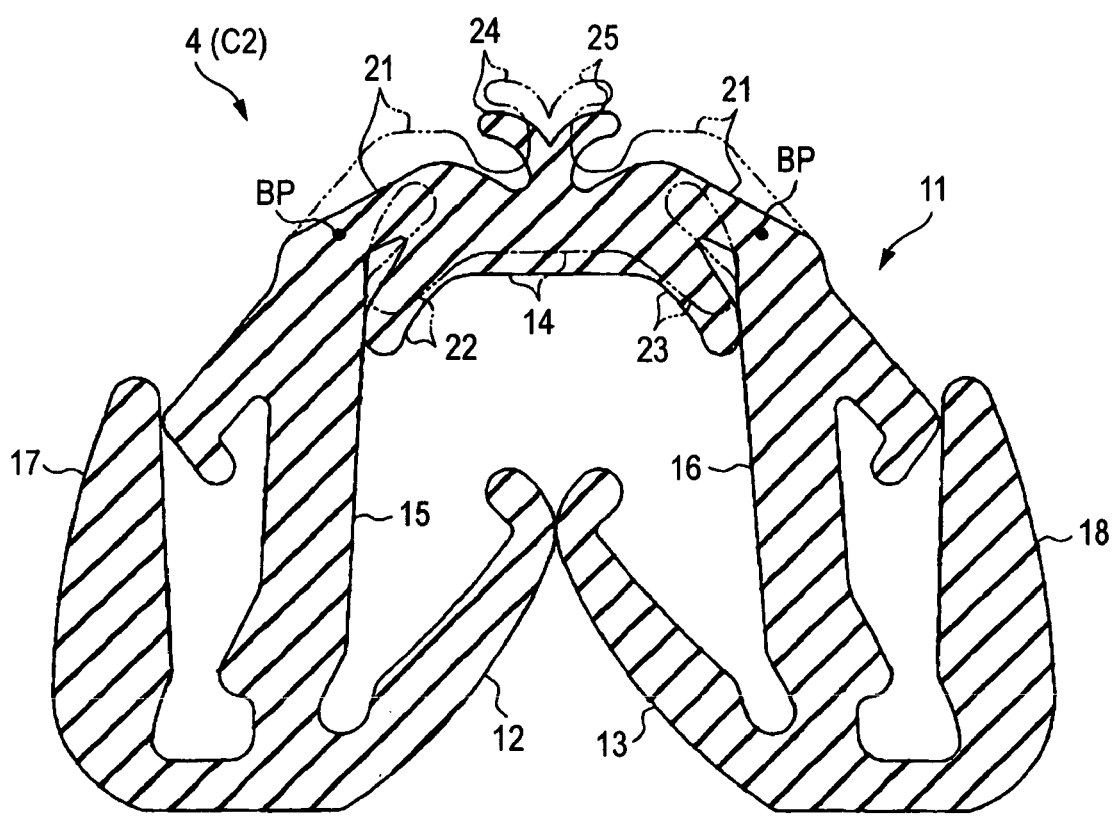
FIG. 5 is a sectional view of a glass run at a corner portion corresponding to a section taken along a line V-V of FIG. 2.

According to the embodiment, the base bottom portion and the two side wall portions are not directly connected but the base bottom portion 14 and the vehicle exterior side wall portion 15 as well as the base bottom portion 14 and the vehicle interior side wall portion 16 are respectively connected by deformed connecting portions 21. The deformed connecting portion 21 is thin-walled more than the two side wall portions 15 and 16 and a section thereof is made to constitute substantially J-like shape to provide a predetermined length in a width direction. Further, under such a constitution, the two corner portions C1 and C2 of the glass run 4 are continuously bent without providing a slit or a notch. Here, as shown by FIG. 5, the deformed connecting portions 21 at vicinities of end portions on sides of the vehicle exterior side wall portion 15 and the vehicle interior side wall portion 16 are provided with fold portions (fold points BP in a sectional view thereof), at the two corner portion C1 and C2, the deformed connecting portions 21 are deformed by being folded to bend at the fold portions (fold points BP). Thereby, at the corner portions C1 and C2, the base bottom portion 14 is smoothly disposed on the inner peripheral side (lower side of FIG. 1). That is, at the two corner portions C1 and C2, in comparison with other portion, the base bottom portion 14 is disposed on the inner peripheral side and the positioning is carried out smoothly, thereby, the sectional shape is bent without making the sectional shape irregular.

Further, according to the embodiment, the inner peripheral face of the base bottom portion 14 is provided with guide lips 22 and 23 which are extended from the base bottom portion 14 to the respective side wall portions 15 and 16 and front ends of which are substantially brought into contact with the respective side wall portions 15 and 16.

Further, an outer peripheral face of the base bottom portion 14 is provided with water invasion preventing lips 24 and 25 capable of being brought into contact with the channel portion 3C. According to the embodiment, the water invasion preventing lips 24 and 25 constitute a pair, a front end of the water invasion preventing lip 24 on a side of the vehicle exterior side wall portion 15 is extended to the vehicle exterior side, and a front end of the water invasion preventing lip 25 on a side of the vehicle interior side wall portion 16 is extended to the vehicle interior side.

In addition thereto, according to the embodiment, the main body portion 11 including the guide lips 22 and 23 and the water invasion preventing lips 24 and 25 constitutes a symmetrical shape centering on a center in a width direction.

According to the embodiment constituted as described above, the entire region in the longitudinal direction of the glass run 4 comprising the upper side portion 6, the front vertical side portion 7, the rear vertical side portion 8 and the two corner portions C1 and C2 is formed by extrusion, and therefore, different from a case of constituting a glass run by connecting by injection molding, the situation that a connecting line appears in an outlook can be avoided. Further, a situation that a difference in collar/luster is partially brought about in the longitudinal direction (peripheral direction) of the glass run 4 can be avoided. As a result, an outlook quality can be promoted. Further, a concern that a stepped difference is formed by connection in the longitudinal direction of the glass run 4 can be avoided, and also a seal performance can be promoted in such meaning. Naturally, a reduction in fabrication cost or a fabrication step number can be achieved by an amount of displacing with injection molding.

Further, the corner portions C1 and C2 are formed by bending without providing a slit or a notch, and therefore, the reduction in the fabrication cost or the fabrication step number can be achieved by an amount of displacing with working for forming the corner portion of a notch or the like.

On the other hand, although there is a concern of bringing about a warp or like in the sectional shape by bending since working a notch or the like is not carried out, according to the embodiment, bending is carried out at the two corner portions C1 and C2 by making the base bottom portion 14 disposed on the inner peripheral side in comparison with other portion. Further in details, an interval between the base bottom portion 14 and the vehicle exterior side wall portion 15 as well as an interval between the base bottom portion 14 and the vehicle interior side wall portion 16 are connected by the deformed connecting portions 21 which are thin-walled and constitute the section substantially in the J-like shape to provide predetermined lengths in the width direction. Further, at the two corner portions C1 and C2, the deformed connecting portions 21 are deformed by being folded to bend at the fold portions (fold points BP) of the deformed connecting portions 21, thereby, the base bottom portion 14 is smoothly disposed on the inner peripheral side. As a result, reasonable smooth bending can be carried out without forming a notch or the like, a situation that the sectional shapes of the corner portions C1 and C2 become significantly irregular by the stress in accordance with the bending can be avoided (for example, even when a radius of curvature is 60 mm, bending can be carried out without bringing about irregular deformation particularly). As a result, the glass run 4 can be mounted easily and stably, and the function of the glass run 4 can sufficiently be achieved.

Particularly, according to the embodiment, the main body portion 11 constitutes the symmetrical shape centering on the center in the width direction, and therefore, in making the base bottom portion 14 disposed on the inner peripheral side at the two corner portions C1 and C2, a situation of inclining the base bottom portion 14 is difficult to be brought about, and the base bottom portion 14 can be disposed on the inner peripheral side smoothly by maintaining an angular relationship of the base bottom portion 14 relative to the two side wall portions 15 and 16. As a result, a situation that the sectional shape becomes irregular at the corner portions C1 and C2 can further easily be avoided.

Further, according to the embodiment, the inner peripheral face of the base bottom portion 14 is provided with the guide lips 22 and 23. Therefore, when the base bottom portion 14 is disposed on the inner peripheral side at the two corner portions C1 and C2, as shown by FIG. 5, the base bottom portion 14 can smoothly be disposed on the inner peripheral side while guiding the two guide lips 22 and 23 by the two side wall portions 15 and 16 (occasionally, while sliding along wall faces of the two side wall portions). As a result, a situation that the sectional shape becomes irregular at the corner portions C1 and C2 can further easily be avoided. Particularly, by constituting the symmetrical shape as in the embodiment, the above-described effect can further be ensured.

Further, since the outer peripheral face of the base bottom portion 14 is provided with the water invasion preventing lips 24 and 25, the situation that water invades the inner portion by way of the channel portion 3C can be prevented. Particularly, the water invasion preventing lips 24 and 25 constitute the pair as described above and constitute the symmetrical shape as a whole. Therefore, water can be prevented from invading further firmly and a drawback by a mistake in mounting can be prevented.

Second Embodiment

Figure 6:
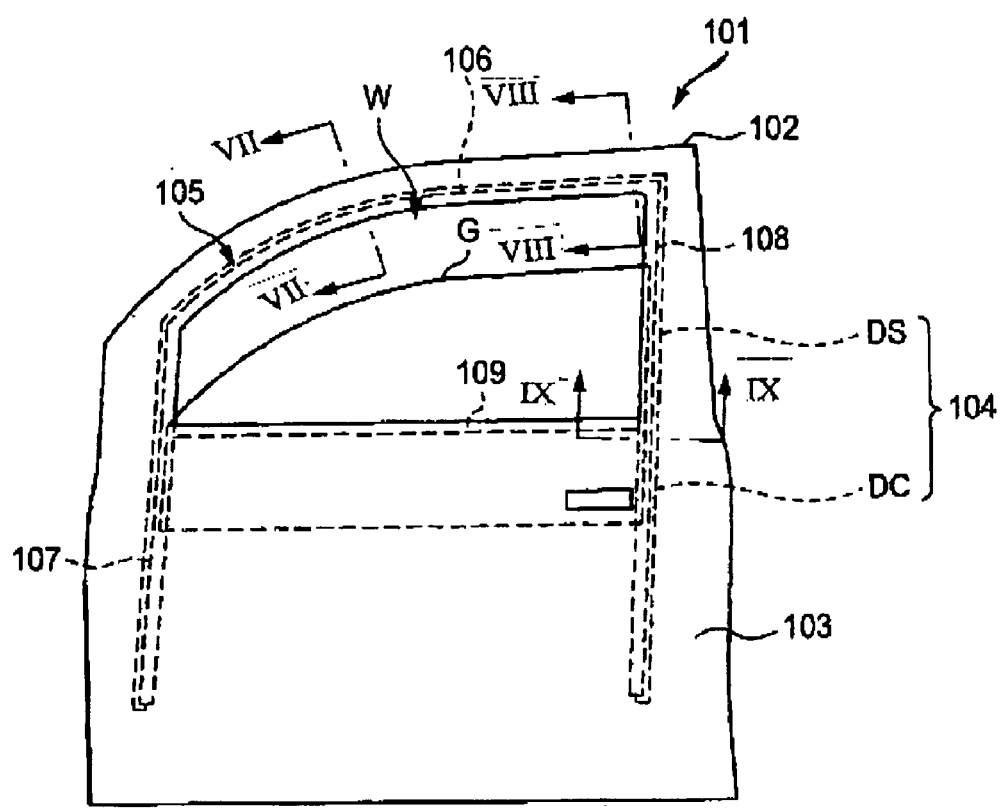
FIG. 6 is a front schematic view showing an outline constitution of a door according to a second embodiment
Figure 7:
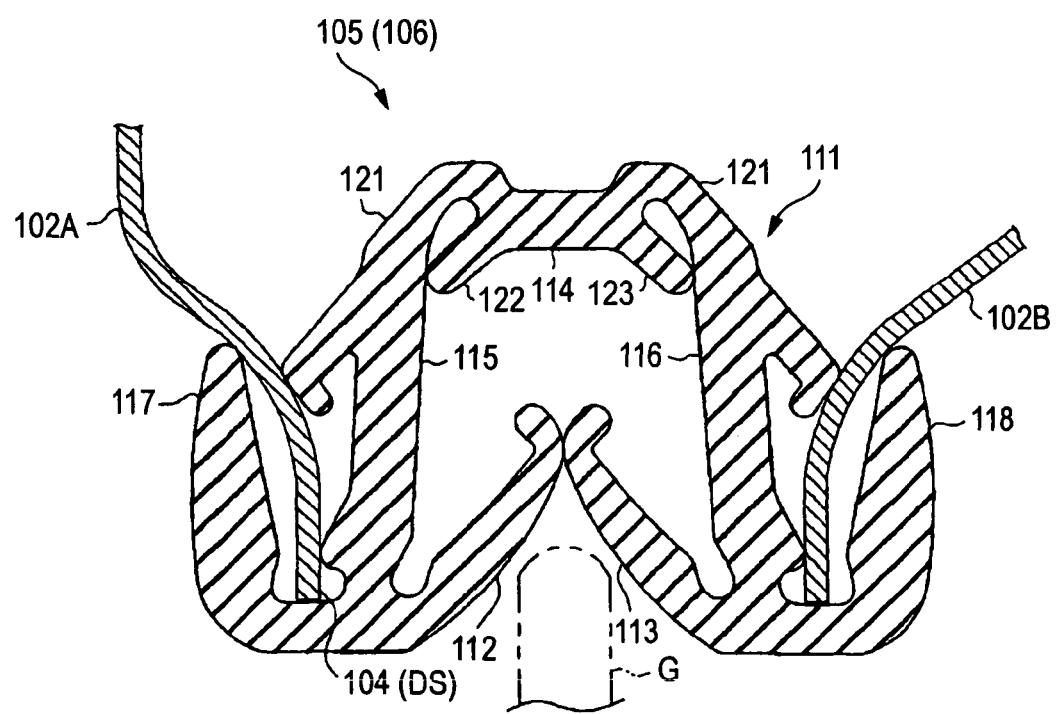
FIG. 7 is a sectional view taken along a line VII-VII of FIG. 6 showing a glass run at an upper side portion.
Figure 8:
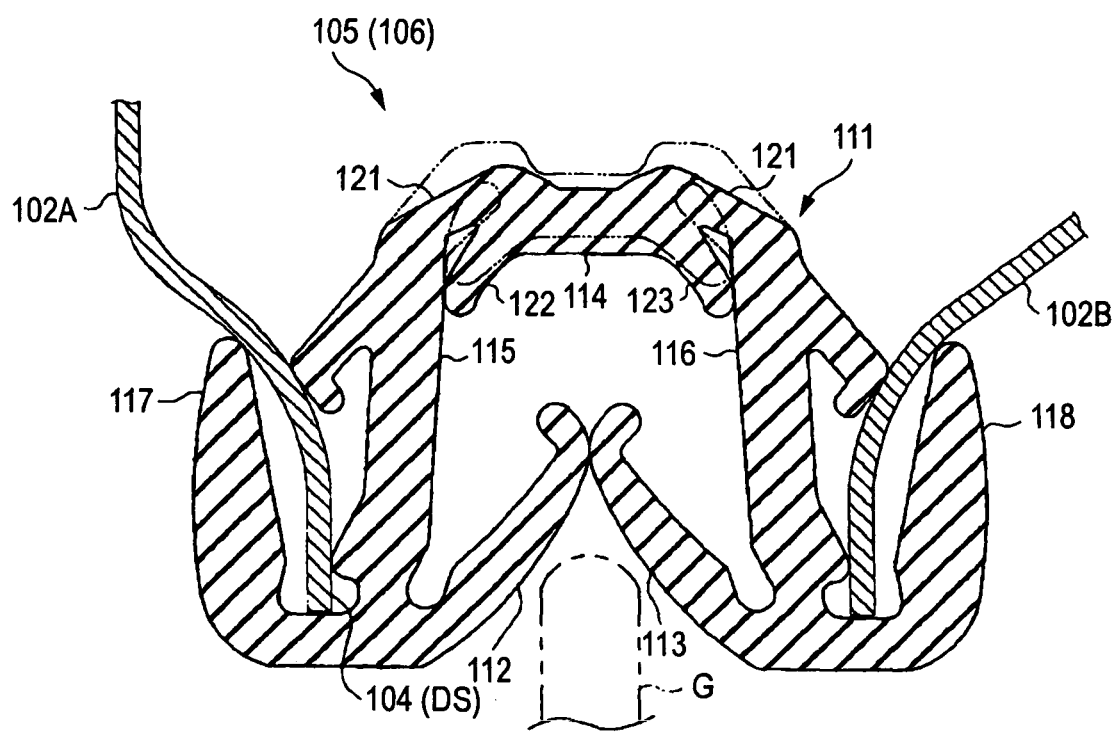
FIG. 8 is a sectional view taken along a line VIII-VIII of FIG. 6 showing a glass run at a corner portion.
Figure 9:
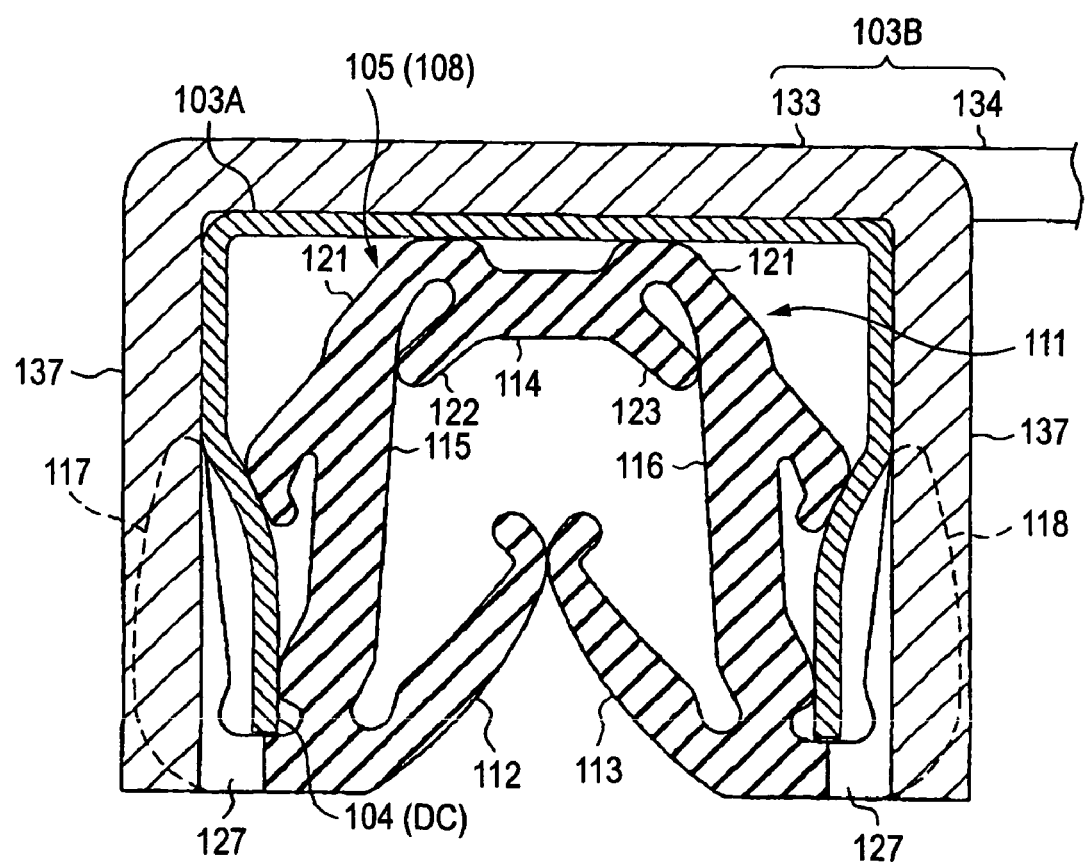
FIG. 9 is a sectional view taken along a line IX-IX of FIG. 6 showing a glass run at a vertical side portion.

A second embodiment will be explained in reference to the drawings as follows. FIG. 6 is a front schematic view showing an outline constitution of a door. FIG. 7 is a sectional view taken along a line X-X of FIG. 6 showing an upper side portion of a glass run. FIG. 8 is a sectional view taken along a line Y-Y showing a glass run at a corner portion. FIG. 9 is a sectional view taken along a line Z-Z showing a rear vertical side view of a glass run.

As shown by FIG. 6, a front door 101 (hereinafter, simply referred to as door) provided openably/closably at an opening portion for the door of an automobile is provided with door glass G, and a glass run 105 provided corresponding to an outer peripheral shape of the door glass G, guiding to move up and down the door glass G, and sealing an interval between an outer periphery of the door glass G and a door frame 102 when the door glass G is moved up and a glass opening portion W is closed. Further, the door 101 is provided with a glass weather strip (belt line sash 109) along a belt line.

The glass run 105 includes an upper side portion 106 constituting a portion corresponding to an upper edge portion of the door glass G, a front vertical edge portion 107 constituting a portion extended downward from a front end portion of the upper side portion 106 corresponding to a front edge portion of the door glass G, and a rear vertical edge portion 108 extended downward from a rear edge portion of the upper side portion 106 corresponding to a rear edge portion of the door glass G. The glass run 105 according to the embodiment comprises EPDM (ethylene-propylene-diene copolymer) rubber, and an entire region in a longitudinal direction comprising the front vertical side portion 107, the upper side portion 106 and the rear vertical side portion 108 is formed by extrusion. Further, the glass run 105 is attached to the inner side of an attaching portion 104 formed along an inner periphery of the door frame 102.

As shown by FIG. 7, the upper side portion 106 of the glass run 105 includes a main body portion 111 and a vehicle exterior side seal lip 112 and a vehicle interior side seal lip 113. The main body portion 111 includes a base bottom portion 114 fitted to the attaching portion 104, and a vehicle exterior side wall portion 115 and a vehicle interior side wall portion 116 extended in a direction substantially orthogonal to the base bottom portion 114 and a section thereof is constituted by substantially a U-shape as a whole. The vehicle exterior side seal lip 112 is extended from substantially a front end of the vehicle exterior side wall portion 115 to an inner side of the main body portion 111, and the vehicle interior side seal lip 113 is extended from substantially a front end of the vehicle interior side wall portion 116 to the inner side of the main body portion 111. Further, in a state of closing the door glass G, the vehicle exterior side seal lip 112 is brought into press contact with an outer side face of the door glass G, and the vehicle interior side seal lip 113 is brought into press contact with an inner side face of the door glass G. Thereby, a vehicle exterior side and a vehicle interior side of the door glass G are respectively sealed. Further, there are provided a vehicle exterior side design lip 117 extended from the vehicle exterior side wall portion 115 to the vehicle exterior side and a vehicle interior side design lip 118 extended from the vehicle interior side wall portion 116 to the vehicle interior side.

Further, according to the embodiment, the entire region in the longitudinal direction of the glass run 105 is formed as one piece of a continuous member only by extrusion, and therefore, any of the upper side portion 106, the front vertical side portion 107 and the rear vertical side portion 108 is provided with the main body portion 111 and the pair of seal lips 112 and 113 and the like and is basically constituted by the same sectional shape.

However, with regard to the attaching portion 104, a portion disposed upward from the belt line (belt line sash 109) and provided along an outer periphery of the glass opening portion W (hereinafter, referred to as sash portion DS) and a portion disposed downward from the belt line and provided at inside of the door panel 103 (hereinafter, referred to as channel portion DC) are provided with different sectional shapes.

As shown by FIG. 7 and FIG. 8, the sash portion DS is constituted by folding to bend end portions of an outer panel 102A and an inner panel 102B constituting the door frame 102 to an inner peripheral side (lower side in FIG. 7) of the glass opening portion W. That is, the glass run 105 is attached to the sash portion DS by fitting the main body portion 111 between the outer panel 102A and the inner panel 102B such that the outer panel 102A is squeezed by the vehicle exterior side design lip 117 and the vehicle exterior side wall portion 115 and the inner panel 102B is squeezed by the vehicle interior side design lip 118 and the vehicle interior side wall portion 116.

On the other hand, as shown by FIG. 9 and the like, the channel portion DC includes a channel member 103A extended in an up and down direction along the front and rear vertical side portions of the door glass G and so as to constitute a U-shaped section, and a connecting portion 103B for connecting a predetermined portion of the channel member 103A and the inner panel 102B. Further, the glass run 105 is attached to the channel portion DC such that side wall portions of the channel member 103A are squeezed between the vehicle exterior side design lip 117 and the vehicle exterior side wall portion 115, and between the vehicle interior side design lip 118 and the vehicle interior side wall portion 116. Further, the connecting portions 103B are provided at two upper and lower portions of the channel member 103A.

Reduction in cost and light-weighted formation are achieved by constructing a constitution of not interposing the channel member between the outer panel 102A and the inner panel 102B (channel-less structure) with regard to the portion of the attaching portion 104 upward from the belt line (sash portion DS).

In addition thereto, the inner side face of the base bottom portion 114 and door glass sliding faces or the like of the seal lips 112 and 113 are subjected to a surface treatment in order to promote a slidability of the door glass G. As a surface treatment, for example, it is pointed out to form a sliding layer by pasting a polyethylene (PE) tape or the like to the inner side face of the base bottom portion 114, to form a coated film (for example, urethane coated film) at surfaces of the seal lips 112 and 113, to implant hairs at the surfaces of the seal lips 112 and 113 or the like.

Further, according to the embodiment, deformed connecting portions 121 are formed at a boundary portion of the base bottom portion 114 and the vehicle exterior side wall portion 115 and a boundary portion of the base bottom portion 114 and the vehicle interior side wall portion 116. The deformed connecting portion 121 is thin-walled more than other portion of the main body portion 111 (base bottom portion 114 and the two side wall portions 115 and 116). Further, the pair of left and right deformed connecting portions 121 are extended from the vehicle exterior side wall portion 115 and the vehicle interior side wall portion 116 to be inclined in directions of being proximate to each other toward an outer peripheral side (upper side of FIG. 7 and FIG. 8) of the glass opening portion W, respective front end portion thereof are formed to bend to an inner peripheral side of the glass opening portion W (inner side of the main body portion 111), and sections thereof are substantially constituted by a J-like shape as a whole.

Further, in attaching the glass run 105 to the attaching portion 104 (sash portion DS), when the glass run 105 is bent to follow a shape of the corner portion, as shown by FIG. 8, the deformed connecting portion 121 is deformed to be inclined to the inner side of the main body portion 111. Thereby, the base bottom portion 114 is smoothly deformed to an inner peripheral side (lower side of FIG. 8) of the glass opening portion W from a position indicated by a two-dotted chain line of FIG. 8 to a position indicated by a bold line of the drawing. That is, at the corner portion, in comparison with other portion (linear portion), the base bottom portion 114 is bent without making the sectional shape irregular by making the base bottom portion 114 disposed on the inner peripheral side of the glass opening portion W and smoothly carrying out the positioning.

Further, the inner side face of the base bottom portion 114 is provided with guide lips 122 and 123 which are extended from the base bottom portion 114 to the respective side wall portions 115 and 116 and front ends of which are substantially brought into contact with the respective side wall portions 115 and 116, and in deforming the base bottom portion 114 to the inner peripheral side of the glass opening portion W at the two corner portions, the two guide lips 122 and 123 are guided by the two side wall portions 115 and 116. Thereby, a situation that the sectional shape becomes irregular at the corner portion is avoided further easily. Further, according to the embodiment, the main body portion 111 including the deformed connecting portion 121, the guide lips 122 and 123 and the like constitute a symmetrical shape centering on a center in a width direction. Therefore, in deforming the base bottom portion 114 to the inner peripheral side of the glass opening portion W at the corner portion, a situation of inclining the base bottom portion 114 is difficult to be brought about, and the base bottom portion 114 can be positioned to be inner peripheral side while maintaining an angular relationship of the base bottom portion 114 relative to the two side wall portions 115 and 116. As a result, a situation that the sectional shape becomes irregular at the corner portion is avoided further easily.

Now, the embodiment includes a constitution for preventing a positional shift in the longitudinal direction of the glass run 105 on a side downward from the belt line (belt line sash 109). The constitution will be explained in reference to FIG. 9 and FIG. 10 as follows. Further, FIG. 10 is a partial perspective view showing the glass run 105 (rear vertical side portion 108) attached to the channel portion DC.

Figure 10:
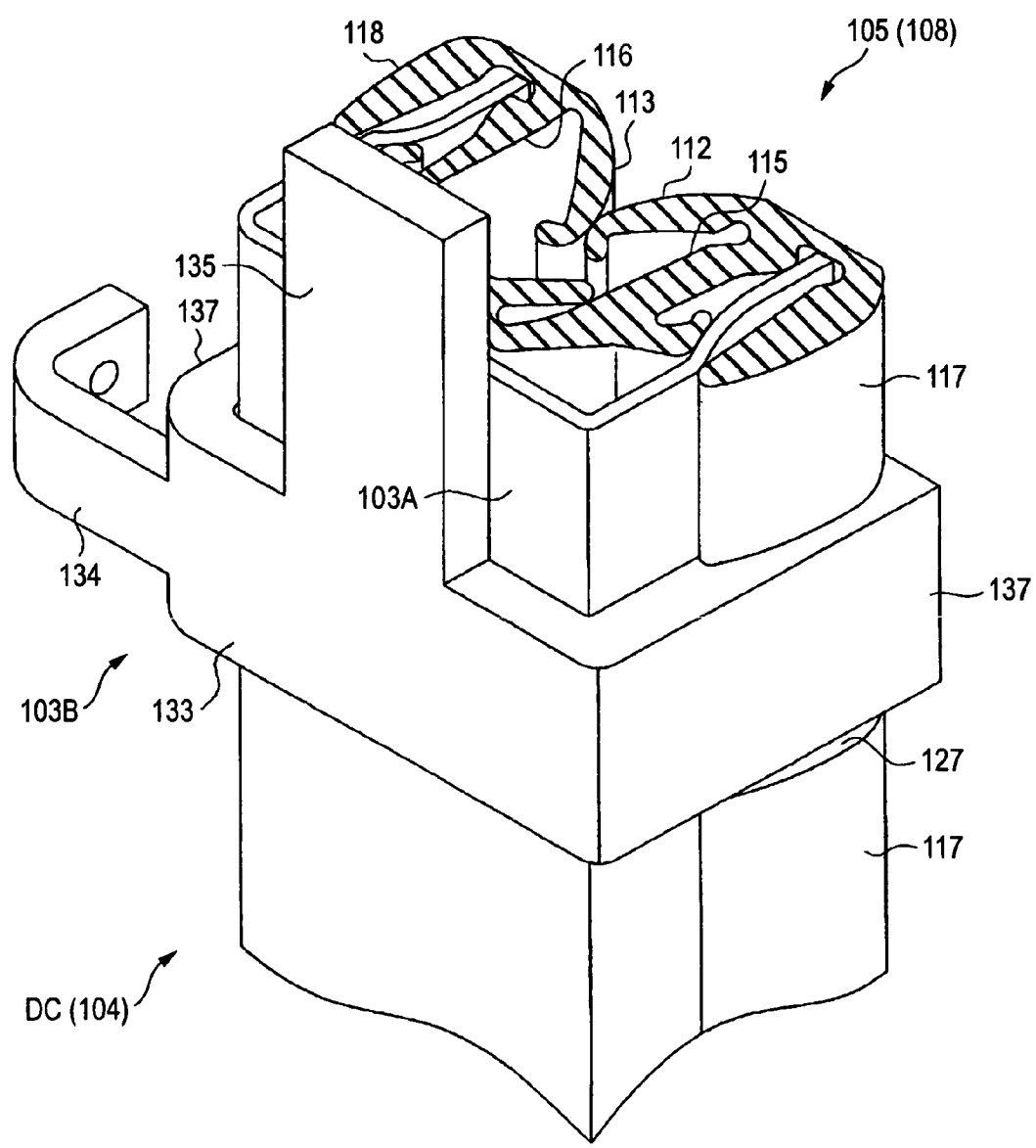
FIG. 10 is a partial perspective view showing a glass run at a vertical side portion.

As shown by FIG. 10, the connecting portion 103B of the channel portion DC includes a backing portion 133 fixed to aback face of the channel member 103A by spot welding, a fixing portion 134 fixed to the inner panel 102B by a fixing member of a bolt, a rivet or the like, and an inserting portion 135 projected upward from the backing portion 133. The inserting portion 135 is inserted into a recessed portion (not illustrated) formed at the door frame 102 upward from the belt line in attaching the channel portion DC to the inner panel 102B. A positional shift in a direction of rotating the channel portion DC is restricted by the inserting portion 135.

According to the embodiment, the backing portion 133 includes a pair of engaging projected portions 137 extended to the inner peripheral side of the glass opening portion W along the two side faces of the channel member 103A. That is, the backing portion 133 and the engaging projected portions 137 are formed substantially in a U-shape in a section thereof to surround the channel member 103A. Further, the engaging projected portion 137 is extended to the inner peripheral side (lower side of FIG. 9, right side of FIG. 10) of the glass opening portion W more than the side wall portion of the channel member 103A and is substantially brought into contact with an outer face of the side wall portion of the channel member 103A. Further, the fixing portion 134 is constructed by a constitution of being fixed to the inner panel 102B, and therefore, a portion of connecting the connecting portion 103B and the inner panel 102B is not exposed to an outlook, and an outlook quality can be prevented from being deteriorated.

On the other hand, the rear vertical side portion 108 is provided with an engaging recessed portion 127 formed by notching the vehicle exterior side design lip 117 and the vehicle interior side design lip 118 at a portion thereof corresponding to the engaging projected portion 137. Further, in a state of attaching the glass run 105 (rear vertical side portion 108) to the attaching portion 104 (channel portion DC), the engaging projected portion 137 is engaged with the engaging recessed portion 127. Further in details, the design lips 117 and 118 of the rear vertical side portion 108 fitted to the channel member 103A are disposed on outer sides of inner side faces of the engaging projected portion 137 and when viewed in the longitudinal direction (up and down direction), at least portions of the design lips 117 and 118 overlap the engaging projected portion 137. Therefore, even when a stress of shifting to the longitudinal direction is applied to the glass run 105, the design lips 117 and 118 are brought into contact with the engaging projected portions 137 at an upper edge portion or a lower edge portion of the engaging recessed portion 127 to thereby restrict shift movement in the longitudinal direction. According to the embodiment, an engaging portion is constituted by the engaging recessed portion 127 and an engaged portion is constituted by the engaging projected portion 137.

Further, according to the embodiment, it is designed to form a clearance for permitting a fabrication error or an integration error between the engaging projected portion 137 and the engaging recessed portion 127 (for example, about 3 mm for respective upper and lower sides). Further, also with regard to the front vertical side portion 107, similar to the rear vertical side portion 108, there is provided the engaging recessed portion 127 formed by notching a portion of the connecting portion 103B corresponding to the engaging projected portion 137, and the engaging recessed portion 127 is engaged with the engaging projected portion 137 in correspondence therewith.

According to the embodiment constituted as described above, the entire region in the longitudinal direction of the glass run 105 comprising the upper side portion 106, the front vertical side portion 107 and the rear vertical side portion 108 is formed by extrusion, and therefore, different from a case of constituting a glass run by connecting an extruded portion and a molded portion in a longitudinal direction, a situation that a connecting line appears in an outlook can be avoided. Further, a situation of bringing about a difference in color/luster partially in the longitudinal direction (peripheral direction) of the glass run 105 can be avoided. As a result, an outlook quality can be promoted. Further, a concern that an unnecessary stepped difference caused by connection in the longitudinal direction of the glass run 105 can be avoided, and also the seal performance can be promoted in the meaning. Further, a remarkable reduction in a number of steps required for fabrication, and therefore, promotion of a fabrication efficiency can be achieved.

Further, by engaging the engaging recessed portion 127 formed at the glass run 105 with the engaging projected portion 137 provided at the channel portion DC (connecting portion 103B), shift movement in the longitudinal direction of the glass run 105 is restricted. Therefore, in opening/ closing (moving up/down) of the door glass G or the like, a situation that the glass run 105 is shifted to move in the longitudinal direction can be prevented. Further, the engaging recessed portion 127 and the engaging projected portion 137 are provided downward from the belt line (belt line sash 109), that is, at a portion which is disposed at inside of the door panel 103 and does not appear in the outlook. Therefore, a situation of bringing about a reduction in the outlook quality owing to optically recognizing the engaging recessed portion 127 and the engaging projected portion 137 can be avoided. In addition thereto, for example, a reduction in a fabrication efficiency can be restrained since it is not necessary to carry out a injection molding step separately after extrusion as in a case of partially providing a projection locked by a hole portion or a recessed portion formed at an attaching portion for preventing a shift.

Further, the engaging recessed portions 127 are formed on the design lips 117 and 118. Therefore, a situation of bringing about a reduction in a function of the glass run (reduction in seal performance or the like) owing to forming the engaging recessed portions 127 at the main body portion 111 or the seal lips 112 and 113 can be prevented.

Further, the engaging projected portion 137 engaged with the engaging recessed portion 127 can comparatively easily be formed by partially changing a shape of the connecting portion 103B (backing portion 133) for fixing the channel member 103A to the inner panel 102B. Therefore, a situation of bringing about a reduction in a fabrication efficiency caused by forming the engaging projected portion 137 may be avoided.

Further, according to the embodiment, in attaching the glass run 105 to the attaching portion 104 (sash portion DS), at a corner portion, in comparison with other portion, the base bottom portion 114 is displaced to the inner peripheral side of the glass opening portion W. Thereby, reasonable smooth bending can be carried out without forming a slit or the like at a portion of the glass run 105 corresponding to the corner portion. Therefore, a situation that a sectional shape at the corner portion becomes significantly irregular by a stress in accordance with the bending is avoided. As a result, the glass run 105 can easily and stably be mounted and the function of the glass run can sufficiently be achieved. Further, according to the embodiment, it is not necessary to form a slit, a notch or the like for the main body portion 111 or the seal lips 112 and 113, and therefore, a reduction in the seal performance and a reduction in the outlook quality can firmly be prevented.

Further, the invention is not limited to a described content of the embodiments but may be embodied, for example, as follows. Naturally, other application example or modification example which is not exemplified in the following can naturally be embodied.

(a) Although according to the first embodiment, the main body portion 11 constitutes the symmetrical shape centering on the center in the width direction, the main body portion 11 is not necessarily be constituted by the symmetrical shape.

(b) The guide lips 22 and 23 of the first embodiment may be omitted. Further, the water invasion preventing lips 24 and 25 may be omitted, or a single water invasion preventing lip may be provided.

(c) The two design lips 17 and 18 of the first embodiment may be omitted.

(d) Means for preventing a shift in the longitudinal direction of the glass run 4 in the door frame may separately be provided although it is not particularly referred to in the first embodiment.

Although according to the embodiment, the glass run 4 is constituted by EPDM, the glass run 4 may be constituted by other material of olefin species thermoplastic elastomer (TPO) or the like.

(f) Although according to the first embodiment, the glass run 1 of the front door is explained particularly in details, also a glass run of a rear door or the like may similarly be constituted.

Figure 11A:
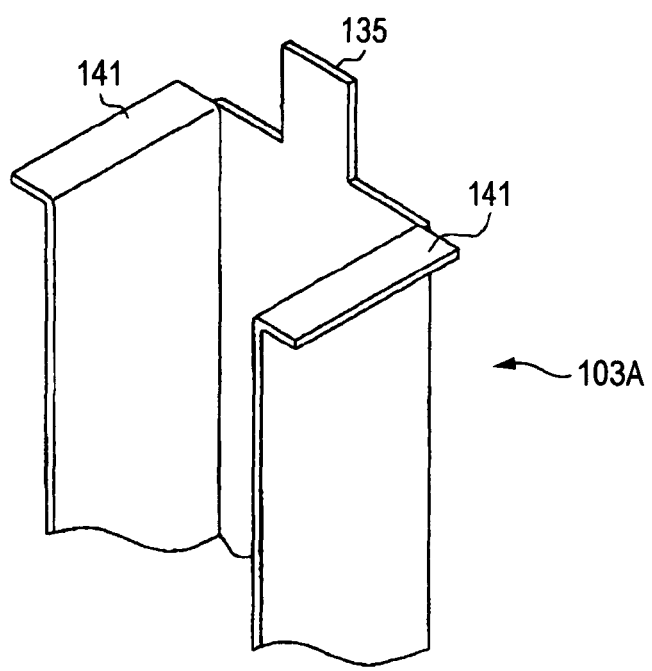
FIGS. 11A and 11B are perspective views showing a channel member according to another embodiment.
Figure 11B:
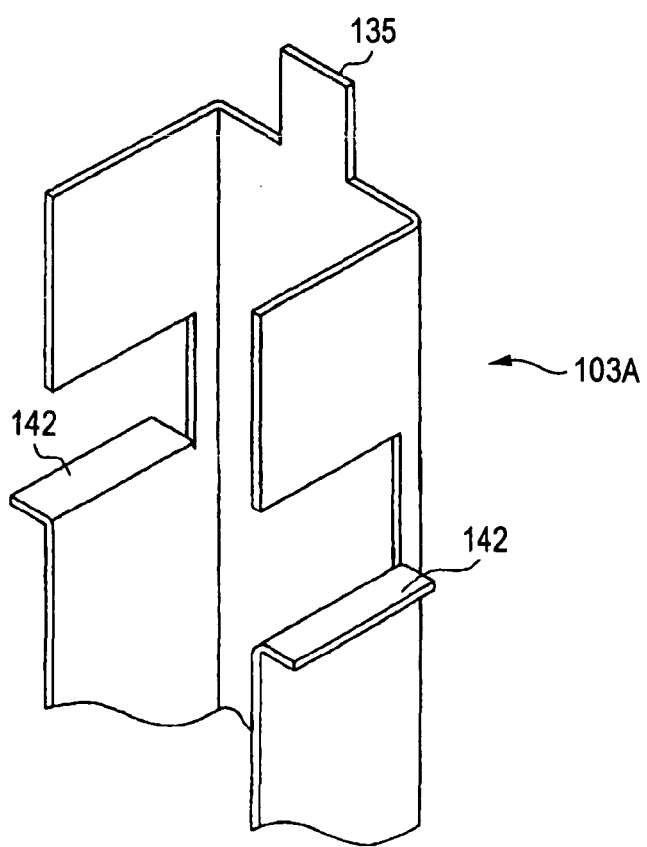

(g) Although according to the second embodiment, the engaging projected portion 137 engaged with the engaging recessed portion 127 is formed for the connecting portion 103B (backing portion 133) of the channel portion DC, for example, as shown by FIGS. 11A and 11B, engaging projected portions 141 and 142 may be formed by folding to bend a portion of the channel member 103A. Further, when the constitution is adopted, the engaging projected portion 137 of the backing portion 133 of the embodiment is omitted. Further, as shown by FIGS. 11A and 11B, the inserting portion 135 for preventing a positional shift in the direction of rotating the channel portion DC may be provided at the channel member 103A. Further, the inserting portion 135 can also be omitted.

(h) Although according to the second embodiment, the engaging recessed portions 127 are formed at the front vertical side portion 107 and the rear vertical side portion 108, the engaging recessed portion 127 may be formed on at least one of the vertical side portions 7 and 8. Further, although the engaging recessed portions 127 are formed on the vehicle exterior side design lip 117 and the vehicle interior side design lip 118, the engaging recessed portion 127 may be formed on at least one of the design lips 117 and 118.

Further, although according to the above-described embodiment, the engaging recessed portions 127 are formed on the design lips 117 and 118, the embodiment is not particularly limited to the constitution but the engaging recessed portion 127 may be formed at other portion. However, when the main body portion 111 per se (base portion 114 and two side wall portions 115 and 116) or the seal lips 112 and 113 per se are notched, there is a concern of deteriorating the function of the glass run, and therefore, it is preferable to provide other portion separately and provide a notch to the other portion. For example, an engaging recessed portion may be formed by forming a projected streak portion projected from the main body portion 111 (base bottom portion 114) to an outer side in extrusion and partially notching the projected streak portion in the longitudinal direction after extrusion. Further, for example, there may be provided a (more or less large) projected portion or lip projected from the side wall portion 115 or 116 to an outer side and brought into press contact with the inner side face of the channel member 103A, or locked by a hump-like portion formed on the inner peripheral side of the channel member 103A, and an engaging recessed portion may be formed at the projected portion or the lip. Even when the constitutions are adopted, the engaging recessed portion 127 can be formed without deteriorating the functions of the main body portion 111 and the seal lips 112 and 113. Further, when the constitution is adopted, the engaging projected portion 137 may be formed by folding to bend a portion of the channel member 103A to the inner side.

(i) Although according to the second embodiment, the main body portion 111 constitutes the symmetrical shape centering on the center in the width direction, the main body portion 111 may not necessarily be constituted by the symmetrical shape. Further, the guide lips 122 and 123 may be omitted.

(j) Although according to the second embodiment, the glass run 105 is constituted by EPDM, the glass run 105 may be constituted by other material of olefin species thermoplastic elastomer (TPO) or the like. Further, although the glass run 105 of the front door is explained particularly in details, also a glass run of a rear door or the like may similarly be constituted.

What is claimed is:

1. An attaching structure comprising:
    an attaching portion comprising a channel member connected to an inner periphery of a door frame of a vehicle;
    a glass run comprising:
        a main body portion attached to the attaching portion, the main body portion including a base bottom portion and a vehicle interior side wall portion and a vehicle exterior side wall portion extended from the base bottom portion and constituting a section thereof comprising substantially a U-shape; and
        a vehicle interior side seal lip and a vehicle exterior side seal lip extended from substantially front ends of the vehicle interior side wall portion and the vehicle exterior side wall portion to an inner side of the main body portion,
    wherein an entire region in a longitudinal direction comprises an upper side portion corresponding to an upper edge portion of door glass, and a front vertical side portion and a rear vertical side portion corresponding to a front edge portion and a rear edge portion of the door glass comprises an extruded portion member,
    wherein at least one of the front vertical side portion and the rear vertical side portion is provided with an engaging portion comprising a notch in a portion of the at least one of the front vertical side portion and the rear vertical side portion at a portion thereof attached to the attaching portion at a lower side of a belt line,
    wherein the attaching portion is provided with an engaged portion engaged with the engaging portion in a state in which the glass run is attached to the attaching portion,
    wherein the glass run includes a vehicle interior side design lip extended from the substantially front end of the vehicle interior side wall portion to a vehicle interior side and a vehicle exterior side design lip extended from the substantial front end of the vehicle exterior side wall portion to a vehicle exterior side, and
    wherein the engaging portion is formed on at least one of the vehicle interior side design lip and the vehicle exterior side design lip.

2. The attaching structure according to claim 1, wherein the channel member comprising a section substantially in a U-shape for fitting the main body portion to an inner side thereof and a connecting portion for connecting the channel member and a door main body are provided at a portion of the attaching portion downward from the belt, and
    wherein the engaged portion engaged with the engaging portion formed on at least one of the vehicle interior side design lip and the vehicle exterior side design lip brought into press contact with an outer side face of the channel member forms a glass opening portion opened and closed by the door glass.

3. The attaching structure of according to claim 1, wherein a channel member comprising a section substantially in a U-shape for fitting the main body portion to an inner side and a connecting portion for connecting the channel member and a door main body is provided at a portion of the attaching portion downward from the belt line, and
    wherein the engaged portion engaged with the engaging portion formed on at least one of the vehicle interior side design lip and the vehicle exterior side design lip brought into press contact with the outer side face of the channel member is formed by folding to bend a portion of the channel member.

4. The attaching structure according to claim 1, wherein a boundary portion of the base bottom portion and the vehicle interior side wall portion and a boundary portion of the base bottom portion and the vehicle exterior side wall portion are provided with deformed connecting portions thin-walled more than other portions of the main body portion, and
    wherein by attaching the glass run to a corner portion of the attaching portion, the deformed connecting portions of the glass run corresponding to the corner portion is inclined so as to be deformed to an inner peripheral side of a glass opening portion of the door frame and the base bottom portion is displaced to the inner peripheral side of the glass opening portion.

5. The attaching structure according to claim 1, wherein the vehicle interior side design lip extends from the vehicle interior side wall portion such that a vehicle exterior side of the vehicle interior side design lip faces a vehicle interior side of the vehicle interior side wall portion.

6. The attaching structure according to claim 1, wherein the vehicle exterior side design lip extends from the vehicle exterior side wall portion such that a vehicle interior side of the vehicle exterior side design lip faces a vehicle exterior side of the vehicle exterior side wall portion.

7. The attaching structure according to claim 1, wherein the notch of the engaging portion comprises a cut-out of the at least one of the front vertical side portion and the rear vertical side portion.

* * * * *